United States Patent [19]

Mazziotti

[11] 4,213,512

[45] Jul. 22, 1980

[54] POWER SHAFT SUPPORT BEARING

[75] Inventor: Philip J. Mazziotti, Toledo, Ohio

[73] Assignee: Dana Corporation, Toledo, Ohio

[21] Appl. No.: 903,683

[22] Filed: May 8, 1978

[51] Int. Cl.² .................... B60K 17/34; B60K 23/04; F16C 23/04

[52] U.S. Cl. ................... 180/233; 74/665 F; 180/70 P; 308/36.1; 308/72

[58] Field of Search .............. 308/15, 29, 72, 36.1, 308/194; 180/70 P, 24, 24.09, 44 R, 233; 74/665 F, 665 H

[56] References Cited

U.S. PATENT DOCUMENTS

| | | | |
|---|---|---|---|
| 1,191,295 | 7/1916 | Fromm | 180/44 R |
| 1,606,747 | 11/1926 | Carter | 308/72 |
| 1,994,133 | 3/1935 | Hendrickson | 180/24.09 |
| 2,081,237 | 5/1937 | Jantsch | 308/72 |
| 2,423,684 | 7/1947 | Collito | 308/72 |
| 2,653,064 | 9/1953 | Heim | 308/194 |
| 2,681,259 | 6/1954 | White | 308/72 |
| 2,731,310 | 1/1956 | Potter | 308/194 |
| 2,859,071 | 11/1958 | Riehl et al. | 308/36.1 |
| 3,243,212 | 3/1966 | May | 308/72 |
| 3,589,781 | 6/1971 | Hanley | 308/36.1 |
| 3,679,016 | 7/1972 | Bixby | 180/44 R |
| 3,915,518 | 10/1975 | McCloskey | 308/72 |
| 4,147,225 | 4/1979 | Mazziotti et al. | 74/665 F |

FOREIGN PATENT DOCUMENTS 1104877 3/1968 United Kingdom ................ 308/72

Primary Examiner—Charles E. Frankfort
Attorney, Agent, or Firm—Wilson, Fraser, Barker & Clemens

[57] ABSTRACT

A bearing assembly for supporting a shaft to enable the shaft to rotate, to move axially, and to pivot relative to the bearing assembly. The bearing assembly includes a first annular bearing for supporting the shaft to provide for relative rotational and axial movement therebetween and having a curved outer bearing surface. A second annular bearing surrounding at least a portion of the curved outer bearing surface of the first bearing and enabling pivotal movement between the first and second bearings. A mounting plate having a portion thereof which circumscribes the second bearing and is adapted to be fixedly mounted. A lubricant reservoir is located in the mounting plate and communicates, through suitably formed passageways, with the bearing surfaces between the first and second bearings and between the first bearing and the supported shaft.

1 Claim, 3 Drawing Figures

POWER SHAFT SUPPORT BEARING

BACKGROUND OF THE INVENTION

In vehicle drive systems wherein relatively long articulated propeller shafts are utilized, for example, to transmit power, there is a necessity to support the shaft at an intermediate position. The support means for these power shafts must enable the shaft to rotate relative to the support means, to pivot about a pivot axis, and also to slide or move axially relative to the support means. Since the support means contains relatively movable contacting bearing surfaces, adequate lubrication means must be provided to constantly enable a flow of lubricating medium to the bearing surfaces.

Attempts have been made in the prior art to design supporting bearing means for rotating shaft, but the resulting bearing structures have been unable to achieve all of the necessary requisites.

The U.S. Pat. No. 1,606,747 to C. W. Carter is directed to a self adjustable shaft bearing wherein the shaft is permitted to rotate and pivot relative to the bearing structure. No structure is disclosed which permits axial movement of the shaft relative to the bearing support, and no means is employed for the continuous introduction of a lubricating medium other than a wooden bushing impregnated with a lubricating oil.

The U.S. Pat. No. 2,423,684 to S. Collito, Jr. relates to a spherical type bearing device for supporting a shaft. Though the bearing structure illustrated in the patent, the supported shaft may rotate, pivot, and move axially with respect to the bearing, but no means is provided to enable the introduction of lubricating medium to all of the bearing surfaces on a continuing basis.

A ball bearing type structures as illustrated in U.S. Pat. Nos. 2,653,064 to L. R. Heim and 2,731,310 to H. L. Patten wherein there is provided a bearing supporting or containing means provided with a lubricant fitting to enable the introduction of a lubricant for the sets of ball bearings. While the bearing structure does permit rotation of the associated shaft, the structure does not allow for relative longitudinal and pivotal movement thereof.

The U.S. Pat. No. 2,859,071 issued to W. Riel et al discloses a rotary shaft seal for automotive vehicles, for example, wherein relative rotary and sliding movement can be achieved between the bearing and the associated shaft. However, the structure of the patent does not permit for relative pivotal movement between the supported shaft and the supporting bearing.

The U.S. Pat. No. 3,243,212 to D. May illustrates a ball and socket joint structure having certain features of the present invention. However, the structure illustrated and described therein does not relate to a bearing for supporting a shaft which is adapted to rotate, slide and pivot or rock relative to the bearing support. The ball and socket does disclose a fluid passage means for conducting a hydraulic fluid to and from a control bore of an associated shaft through passageways in the ball and socket joint.

SUMMARY OF THE INVENTION

The present invention relates to a supporting bearing structure useful in four wheel drive vehicles which are designed for off-the-road use in rough terrain and in adverse environments. The bearing structure of the invention is designed to enable the supported shaft to rotate, slide, and pivot or rock relative thereto while driving all modes thereof, providing lubrication to the bearing surfaces and militating against the introduction of particulate and fluid contaminants into the zones between the cooperating bearing surfaces.

The above objectives are typically achieved by a shaft supporting assembly comprising a first annular bearing means circumscribing the shaft and providing for relative rotational and axial movement therebetween, the bearing means having a hollow internal bearing surface, a curved outer bearing surface, lubricant conducting passageway providing communication between the internal bearing surface and outer bearing surface thereof, and seal means for retaining a lubricant on the internal bearing surface and militating against the introduction of solid and fluid contaminants therein; a second annular bearing means formed of the cooperating sections surrounding the first bearing means and enabling relative pivotal movement therebetween, the bearing means having an internal bearing surface contoured to conform with the curved outer bearing surface of the first bearing means, lubricant conducting passageway providing communication between the internal bearing surface and the outer surface thereof and communicating with the lubricant passageway of the first bearing means, and seal means for retaining a lubricant within the zone defined by the outer curved bearing surface of the first bearing means and the inner curved bearing surface of the second bearing means and militating against the introduction of solid and fluid contamination therein; and a mounting plate circumscribing the outer surface of the two sections of the second annular bearing means to maintain the two sections in juxtaposed position and having an internal lubricant reservoir communicating with the lubricant passageways of the first and second bearing means.

BRIEF DESCRIPTION OF THE DRAWINGS

The above, as well as other objects and advantages of the invention will become readily apparent to one skilled in the art, from reading the following detailed description of an embodiment of the invention when considered in the light of the accompanying drawings, in which.

DETAILED DESCRIPTION OF AN EMBODIMENT OF THE INVENTION

Figure 1:
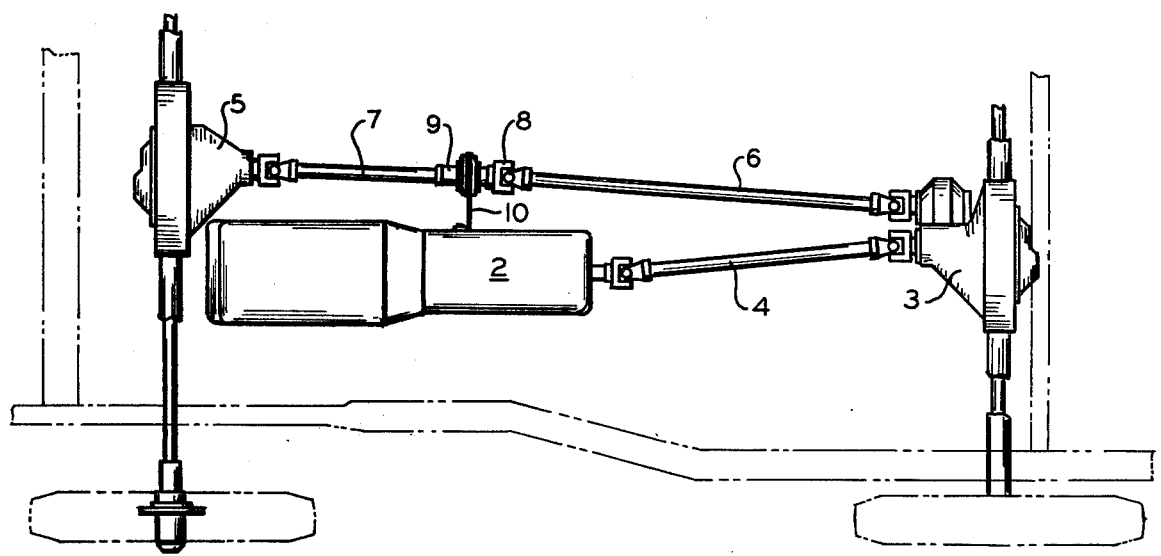
FIG. 1 is a fragmentary top plan view of a drive system of a four wheeled vehicle including a bearing assembly embodying the features of the invention.

Referring to FIG. 1, there is shown in somewhat schematic form, a portion of the drive system for a four wheel drive vehicle having an engine driven transmission 2 for delivering torque to a rear differential 3 through a propeller shaft 4. Torque is delivered to a front differential 5 from the rear differential 3 through articulated propeller shafts 6 and 7 coupled together by a constant velocity universal coupling 8. The front portion of the coupling 8 includes an integral internally splined shaft 9 which cooperates with external splines on the propeller shaft 7. In order to effect the transfer of rotary motion from the engine 2 to the differentials 3 and 5, it should be noted that, as illustrated in FIG. 1, the ends of the shafts 4, 6, and 7 employ universal couplings. Through the use of such an arrangement, rotary motion may be transmitted from the shaft 6 to the shaft 7 while allowing for a limited amount of relative axial movement therebetween.

Since the combined length of the articulated propeller shafts 6 and 7 is rather extensive, the intermediate portion thereof must be supported. Such support is provided by a bearing structure supported by a mounting plate 10 typically connected to the housing of the transmission 2.

Figure 3:
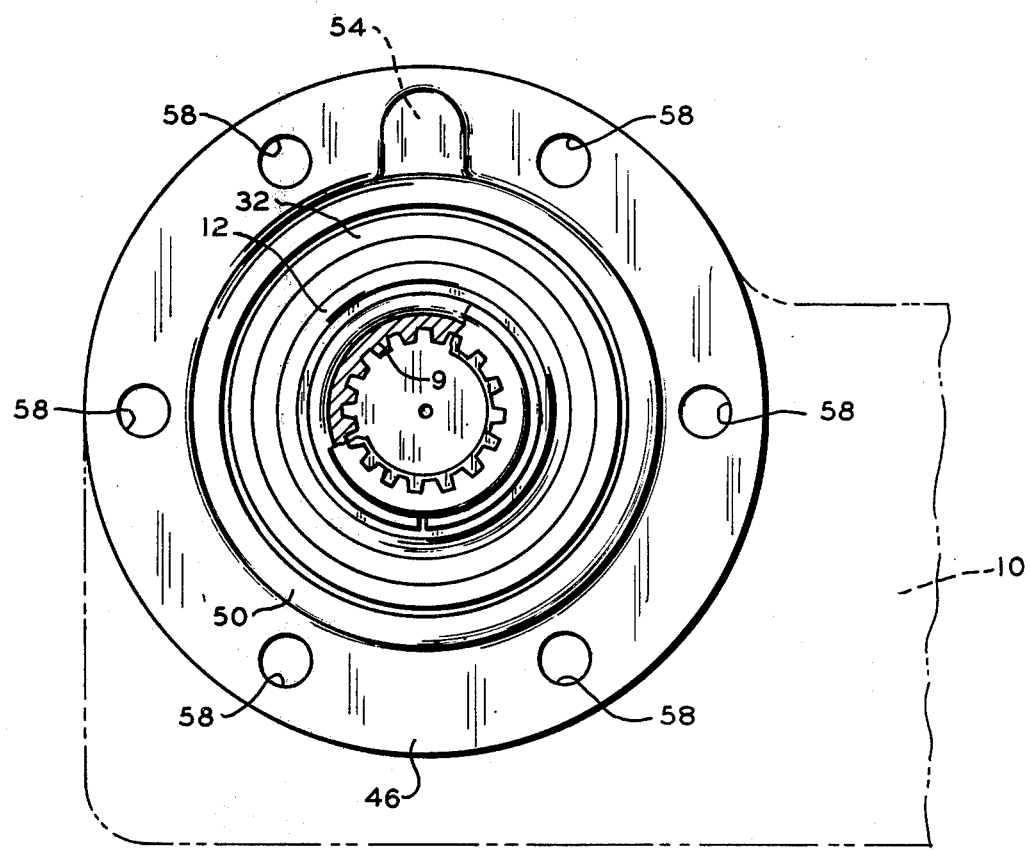
FIG. 3 is an end view of the bearing assembly illustrated in FIG. 2 taken from the left hand side thereof.
Figure 2:
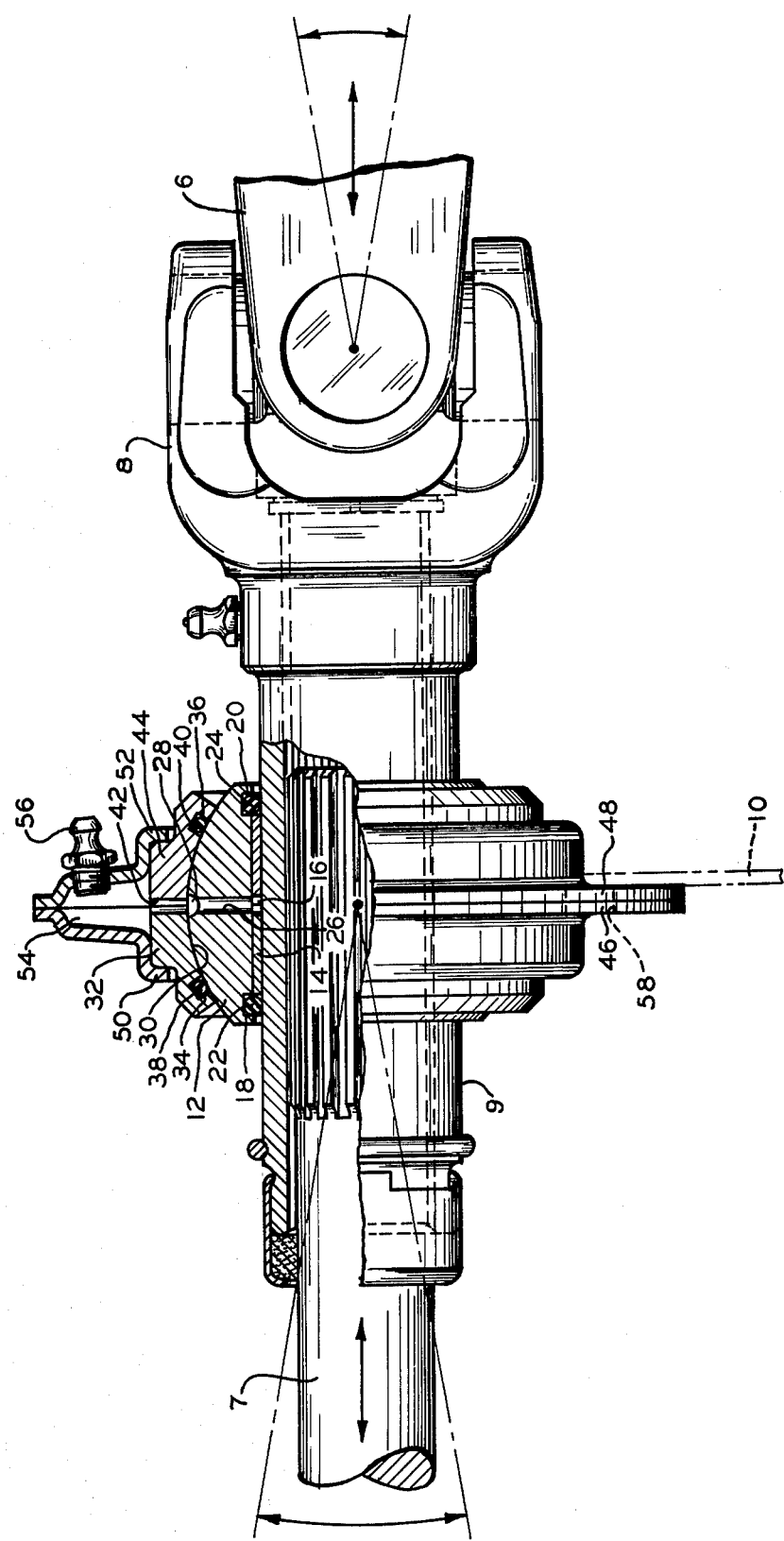
FIG. 2 is an enlarged fragmentary view of the bearing assembly illustrated in FIG. 1 with portions thereof partially broken-away and in section to more clearly illustrate the bearing structure.

The specific bearing structure of the invention is illustrated in FIGS. 2 and 3 wherein there is shown a shaft center bearing 12 which is generally annular in configuration and contains an internal bushing 14. The bushing 14 is typically formed of two cooperating annuli adapted to surround and support the shaft 9. A lubricant passageway 16 is formed in the joining internal marginal edges of the two annuli forming the bushing 14. It has been found that satisfactory results have been achieved by forming the bushing 14 from a woven fiber material such as polytetrafluoroethylene for example.

The outer marginal edge portions of the internal surface of the shaft center bearing 12 are provided with annular grooves 18 and 20 which are adapted to receive and maintain ring seal members 22 and 24 respectively. It will be observed that the ring seals 22 and 24 are in close proximity to the outer edge portions of the bushing 14 and are employed to maintain lubricant within the bearing surface between the inner surface of the bushing 14 and the adjacent outer surface of the shaft 9.

A passageway 26 having an enlarged radially outer end portion 28 is formed in the shaft center bearing 12 and is in general alignment to communicate with the passageway 16 of the bushing 14.

Further, the shaft center bearing 12 is formed to have a curved outer bearing surface 30. A pivot center bearing 32, formed of two cooperating half sections, has a curved inner bearing surface to bear against the outer curved bearing surface 30 of the shaft center bearing 12. The curved inner surface of the cooperating half sections of the pivot center bearing 32 are provided with respective annular grooves 34 and 36 for receiving and maintaining O-rings 38 and 40, respectively. The mating surfaces of the half sections of the pivot center bearing 32 are provided with cooperating radially extending grooves to form a lubricant passageway 42 which aligns with the passageway 26 and the associated enlarged end portion 28 of the shaft center bearing 12. The cooperating half sections of the pivot center bearing 32 are provided with 2 radially outwardly extending shoulder portions to form an annular boss 44.

The two half sections of the pivot center bearing 32 are maintained in an assembled condition by a mounting bracket formed of cooperating sections 46 and 48. The mounting bracket sections 46 and 48 are generally annular in shape and include outwardly and downwardly extending lips 50 and 52, respectively. The downwardly extending lips 50 and 52 are adapted to abut against the outer surface of the annular boss 44 and cooperate to maintain the half sections of the pivot center bearing 32 in an assembled form on the outer curved bearing surface 30 of the shaft center bearing 12. The cooperating bracket sections 46 and 48 are formed to produce an internal lubricant reservoir 54. A zerk-type fitting 56 is typically threaded in a suitable aperture formed in the section 48 to provide communication with the interior of the reservoir 54 and also the passageways 42 and 26.

An annular array of mounting holes 58 are formed in the outer peripheral edge portion of the cooperating section 46 and 48 of the mounting bracket to receive suitable threaded fasteners for mounting the assembly to the mounting plate 10 which, in turn, is affixed to the housing of the transmission 2 as illustrated in FIG. 1.

It has been found that the sections 46 and 48 may be adequately joined together by spot welding procedures at spaced intervals along the annular marginal edge portions thereof. Manifestly, other procedures can be successfully employed to maintain the sections 46 and 48 in an assembled form.

In operation, it will be appreciated that the bearing assembly described above can be advantageously employed to support the shaft 9, which effectively interconnects the propeller shafts 6 and 7, and to permit relative rotational, pivotal, and longitudinal movement between the shaft 9 and the remainder of the supporting bearing construction. More specifically it is apparent that the shaft 9 is free to rotate within the interior of the bushing 14 and is further free to move axially thereof should such movement be precipitated typically by movement of the rear differential 3 during operation of the associated vehicle. Manifestly, the majority of longitudinal movements affected by the movement of the front differential are compensated for by the splined connected between the propeller shaft 8 and the shaft 9. However, there may be severe conditions which may cuase axial movement of the shaft 9 by the movement of the front differential 5.

The bearing assembly also provides for relative pivotal movement of the shaft 9 which is typically caused by vertical motion of the front differential. Such movement is achieved by relative pivotal movement between the outer curved surface 30 of shaft center bearing 12 and the cooperating curved inner surface of the pivot center bearing 32.

At all times during the operation of the bearing assembly of the invention, lubrication is maintained within the associated bearing surfaces. The ring seals 22 and 24 cooperate to retain the lubricant, which flows from the reservoir 54 through the cooperating passageways 42 and 26, within the zone between the outer surface of the shaft 9 and the inner surface of the bushing 14. The O-rings 38 and 40, in a similar manner, cooperate to retain the lubricant, which flows from the reservoir 54 through the passageway 42, within the zone between the curved outer surface of the shaft center bearing 12 and the inner curved surface of the pivot center bearing 32.

In addition to retaining the lubricant in the critical bearing surfaces during the operation of the bearing assembly, the ring seals 22 and 24, and the O-rings 38 and 40 continuously militate against the introduction of any contaminants from entering the critical bearing surfaces. This feature is of paramount importance to the invention since one application of the bearing assembly of the invention is on four wheel drive vehicles designed for off-the-road type use where the bearings are exposed to extremely adverse conditions.

Another feature of the invention which is considered to be important resides in the ability of the bearing assembly to be able to continuously enable the bearing surfaces to be in general communication with the lubricant reservoir 54. The enlarged outer end 28 of the passageway 26 enable communication between the passageways 26 and 42 even during relative pivotal movement between the shaft center bearing 12 and the pivot center bearing 32.

From the foregoing description of the invention, it will be appreciated that the structure illustrated and described is particularly useful in the drive train of a four wheel drive vehicle. In such a system, as will be readily apparent from an examination of the apparatus clearly illustrated in FIG. 2, the propeller shaft 6 is adequately supported for rotary motion and is simultaneously permitted to pivot vertically about the center point of the universal coupling 8. Since the propeller shaft 6 is coupled to the propeller shaft 7 through a splined connection of the shaft 9, the propeller shaft 6 may also move axially of the supporting bearing assembly. Also, while the propeller shaft 7 is adequately supported for rotary motion, it is permitted to move axially of and pivot about the center point of the supporting bearing assembly. Obviously, the rotary, axial, and pivot motion may occur simultaneously or in sequence.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

The embodiments of the invention to which an exclusive property or privilege is claimed are defined as follows:

1. A drive system for a vehicle having front and rear drive wheels, including:
    a rear differential for transmitting torque to the rear drive wheels;
    shaft means for introducing torque to said rear differential including universal coupling means interconnecting one end of said shaft means to the output of a power source and the other end of said shaft means to said rear differential;
    a front differential for transmitting torque to the front drive wheels;
    articulated shaft means for interconnecting said front and rear differentials for transmitting torque therebetween, including universal coupling means interconnecting one end of said articulated shaft means to said rear differential and the other end of said articulated shaft means to said front differential, and at least one other universal coupling means interposed between the ends of said articulated shaft means including a splined shaft interconnecting said articulated shaft means for transmitting rotary motion therebetween and simultaneously permitting relative axial movement;
    first annular bearing means for supporting the splined shaft of said other universal coupling means to provide for relative rotational and axial movement therebetween, said bearing means having a hollow internal bearing surface, a curved outer bearing surface, lubricant conducting passageway providing communication between the internal bearing surface and the outer bearing surface thereof;
    second annular bearing means surrounding said first bearing means and enabling relative pivotal movement therebetween, said bearing means having an internal bearing surface contoured to conform with the curved outer surface, and lubricant conducting passageway providing communication between the internal bearing surface and the outer surface thereof communicating with the lubricant passageway of said first bearing means;
    seal means for retaining a lubricant between the curved outer bearing surface of said first bearing means and the curved inner surface of said second bearing means; and
    a mounting bracket circumscribing the outer surface of said second annular bearing means, said mounting bracket having an internal lubricant reservoir communicating with the lubricant passageways of said first and second bearing means.

* * * * *